(No Model.)

A. P. WILLIAMS.
FERTILIZER DISTRIBUTER.

No. 470,528. Patented Mar. 8, 1892.

WITNESSES:
F. L. Durand
W. L. Coombs

INVENTOR:
Alexander P. Williams
by Sams Jagger & Co.
Attorneys.

UNITED STATES PATENT OFFICE.

ALEXANDER P. WILLIAMS, OF ADAMSVILLE, ASSIGNOR OF ONE-HALF TO WILLIAM M. BREEDEN, OF BENNETTSVILLE, SOUTH CAROLINA.

FERTILIZER-DISTRIBUTER.

SPECIFICATION forming part of Letters Patent No. 470,528, dated March 8, 1892.

Application filed July 13, 1891. Serial No. 399,305. (No model.)

*To all whom it may concern:*

Be it known that I, ALEXANDER P. WILLIAMS, a citizen of the United States, and a resident of Adamsville, in the county of Marlboro and State of South Carolina, have invented certain new and useful Improvements in Fertilizer-Distributers; and I do hereby declare that the following is a full, clear, and exact description of the invention, which will enable others skilled in the art to which it appertains to make and use the same, reference being had to the accompanying drawings, which form a part of this specification.

My invention relates to improvements in fertilizer-distributers, the object being to provide a simple and economical apparatus of this character, by means of which guano or other fertilizing material may be regularly and evenly distributed over a field in an efficient manner.

The invention consists in the novel construction and combination of parts hereinafter fully described, and specifically pointed out in the claim.

Figure 1:
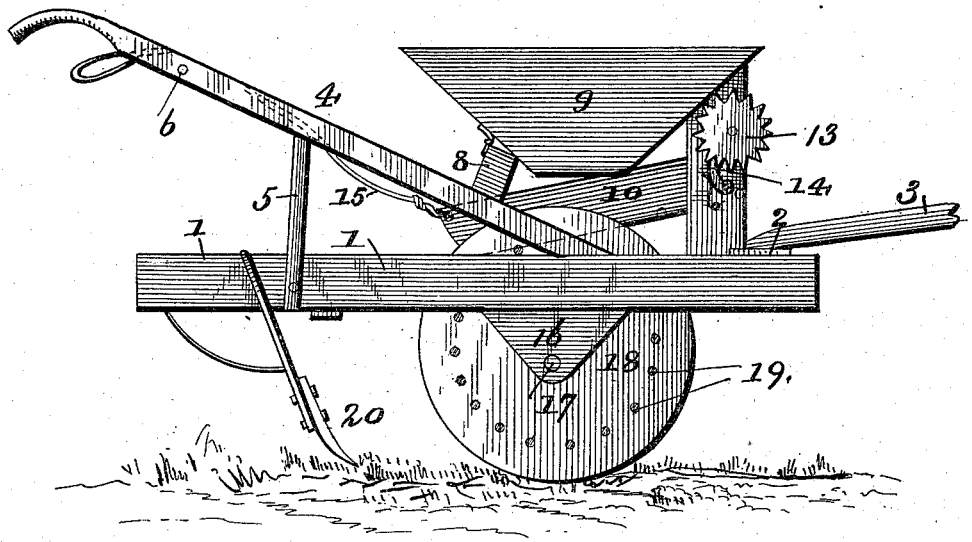
Figure 2:
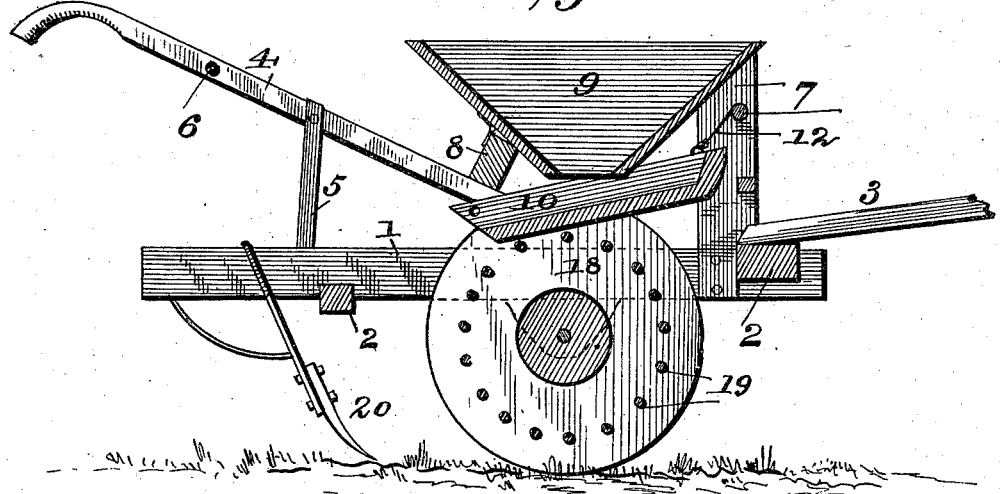

In the accompanying drawings, Figure 1 is a side elevation of a fertilizer-distributer constructed in accordance with my invention. Fig. 2 is a central longitudinal section of the same.

In the said drawings the reference-numeral 1 designates the frame of the apparatus, consisting of longitudinal side bars and crossbars 2, the front cross-bar of which may be connected to the tongue 3 for the draft-animals.

The numeral 4 designates the handles connected with the side bars, near the front ends thereof, and braced by means of the uprights 5. Near their rear ends the handles are connected by the cross-bar 6.

Connected with uprights 7, secured to the front ends of the cross-bars and the cross-bar 8, connected with the handles, is an ordinary hopper 9 for containing the fertilizing material and provided with a central aperture, through which the said material is fed to a vibrating shoe 10, located underneath thereof. This shoe consists of a trough-like plate, having its rear end open and its front end closed, and it is connected at said front end by means of cords or bands 12 with a rotatable rod or shaft journaled in the uprights 7. This shaft at one end is provided with a ratchet-wheel 13, with which engages a pawl 14, pivoted to one of said uprights for the purpose of holding said shaft. By this means it will be noted that the said shoe can be adjusted vertically. The rear end of the shoe is provided with a rod 15, by which it may be raised or elevated for the purpose of stopping the feed of the fertilizing material.

Journaled in boxes 16, secured to the side bars of the frame, is an axle 17, upon which are fixed wheels or annular disks 18. Near the peripheries of these wheels is a series of rods or bars 19, which are arranged in a circle concentric therewith and extend laterally across the space therebetween. The side bars are also provided with ordinary plow-shovels 20.

The operation will be readily understood. As the machine is drawn over a field the rods 19 will successively strike or engage with the rear end of the shoe, alternately raising and lowering the same and causing a vibrating movement to be imparted thereto, whereby the fertilizing material will be uniformly and evenly distributed. The bars 19 are secured to the wheels near the peripheries thereof and serve not only to vibrate the shoe, but also to crush or break up any clods that may be in their path.

Having thus described my invention, what I claim is—

In a fertilizer-distributer, the combination, with the frame, the axle journaled therein, the wheels, the lateral rods connecting the wheels and secured thereto near the peripheries, the handles, the uprights, a rotatable shaft journaled in the uprights and provided with a ratchet-wheel, the pivoted pawl, and the hopper, of the vibrating shoe connected at its front end by means of cords or bands with said rotatable shaft, and the rearwardly-extending rod connected with the opposite end of said shoe, substantially as described.

In testimony that I claim the foregoing as my own I have hereunto affixed my signature in presence of two witnesses.

ALEXANDER P. WILLIAMS.

Witnesses:
T. I. ROGERS,
S. J. MCINNIS.